Dec. 20, 1960   E. F. STEINERT   2,965,805
ARC WELDING APPARATUS
Filed Aug. 20, 1958   3 Sheets-Sheet 1

WITNESSES

INVENTOR
Emil F. Steinert
BY
ATTORNEY

Dec. 20, 1960    E. F. STEINERT    2,965,805
ARC WELDING APPARATUS
Filed Aug. 20, 1958    3 Sheets-Sheet 2

United States Patent Office 2,965,805
Patented Dec. 20, 1960

2,965,805

ARC WELDING APPARATUS

Emil F. Steinert, Williamsville, N.Y., assignor to Westinghouse Electric Corporation, East Pittsburgh, Pa., a corporation of Pennsylvania Filed Aug. 20, 1958, Ser. No. 756,167

7 Claims. (Cl. 315—205)

This invention relates to the arc welding art and has particular relation to arc welding apparatus including arc-drive. The expression "arc drive" refers to provisions included in arc welding apparatus which operates to clear short circuits during a welding operation usually by causing an additional momentary surge of current to flow to blow out the short circuits just before or as soon as they occur. Arc drive is particularly applicable in welding with consumable electrodes having a distinctive droplet transfer as distinct from a spray transfer characteristic. The momentary surge of current from the arc drive has the effect of dislodging the droplet from the end of the electrode and driving it forward usually before it can bridge the arc stream and cause a short circuit.

Arc welding apparatus including arc-drive in accordance with the teachings of the prior art is typified by Bichsel et al. Patent 2,734,981. In the apparatus disclosed in this patent, the arc-drive potential is provided by an auxiliary secondary AS which is connected to the electrode conductor SL1 and the work conductor SL2 through a three-phase rectifier including units 7R, 8R, 9R. In actual practice, the Bichsel et al. invention is incorporated in arc welding apparatus including a transformer-reactor unit as disclosed in Steinert et al. application Serial No. 357,321 filed May 25, 1953, now Patent 2,905,880, issued September 22, 1959, for Electric Arc Welders.

The secondary windings AS1, AS2, AS3 of the Bichsel et al. auxiliary secondary AS are mounted on the fixed core (or transformer core) CF usually between the associated primary windings P1, P2, P3 respectively and the turns T1, T2 and T3 respectively of the secondary-reactors see (Fig. 2 Steinert et al..) The turns T1, T2, T3 link only the transformer core and operate only as secondary and not as reactance.

Many units of apparatus in accordance with the Bichsel et al. patent have been sold and have given highly satisfactory service. But this apparatus has had the disadvantage that on the failure of any winding of the auxiliary secondary AS it was necessary to rebuild the whole transformer-reactor unit because the secondary AS is embedded in the main windings on the fixed core CS (Fig. 2 Steinert et al.). The probability of failure of the auxiliary secondary AS in the Bichsel et al. apparatus is enhanced by the circumstance that the secondary AS is not altogether protected by the thermal element TH. If one of the auxiliary rectifiers 7R, 8R or 9R becomes short-circuited or otherwise loses its back resistance, current can flow through the associated secondary windings and through the other rectifiers independently of the element TH, thus causing failure. This condition could be corrected by providing thermal elements or polyphase circuit breaker units in the series with the three secondaries AS1, AS2, AS3 and the associated rectifiers 8R, 9R and 7R, but the cost of this would in most cases be prohibitive.

It is accordingly an object of this invention to provide arc welding apparatus including arc-drive in which the failure of the arc-drive shall not require that the supply transformer as a whole be rewound or replaced.

Another object of this invention is to provide arc welding apparatus including arc-drive of relatively low cost in which the arc-drive shall be completely protected against overload.

An incidental object of this invention is to provide arc welding apparatus with arc-drive in which the arc-drive means shall be capable of being handled as a separate unit independently of the main transformer and rectifier facilities of the apparatus.

Another incidental object of this invention is to provide arc welding apparatus with highly effective arc-drive, the effectiveness of which shall increase as the load current approaches short circuit magnitudes.

An ancillary object of this invention is to provide a novel transformer-reactor unit.

This invention arises from the discovery that highly effective arc-drive power may be derived from the reactor portion of the arc-welding apparatus. It is this portion of the apparatus which absorbs the excess voltage as short circuiting of the arc approaches and the voltage across the arc decreases. In accordance with this invention, arc-drive power is derived from a coil inductively coupled to the reactor portion of the apparatus. This coil provides a single-phase potential which increases in magnitude as short circuit conditions of the welding arc are approached. The coil is connected preferably through a half-wave rectifier and a circuit breaker between electrode conductor and the work conductor with the rectifier poled so that the potential impressed between the electrode conductor and the load conductor aids the potential impressed between these conductors through the main rectifiers. Since the arc-drive potential is of the half-wave type, the circuit breaker may be connected in the arc-drive circuit in such a way that when it is opened, it opens the coil circuit entirely. Thus, there is no tendency for failure of the type encountered in the Bichsel et al. apparatus to occur.

In accordance with the preferred practice of this invention, the main rectifiers and the rectifier connected to the arc-drive coil are all of the silicon type. Because of this the invention disclosed herein has an important economic advantage over that disclosed in Patent 2,734,981. In the system disclosed in the patent three rectifier legs are connected in the arc-drive circuit. If these rectifiers were of the silicon type three single cells would be necessary. In accordance with this invention only one such cell is required. There is thus a saving of the cost of two cells which is of the order of $50 per welder to the consumer.

The novel features considered characteristic of this invention are disclosed generally above. The invention itself, both as to its organization and as to its method of operation, together with additional objects and advantages thereof, will be understood from the following description of a specific embodiment taken in connection with the accompanying drawings in which.

So that this invention and its relationship to the Steinert et al. application may be understood, the labeling of the Steinert et al. application has been adopted in this application to the extent practicable.

Figure 1:
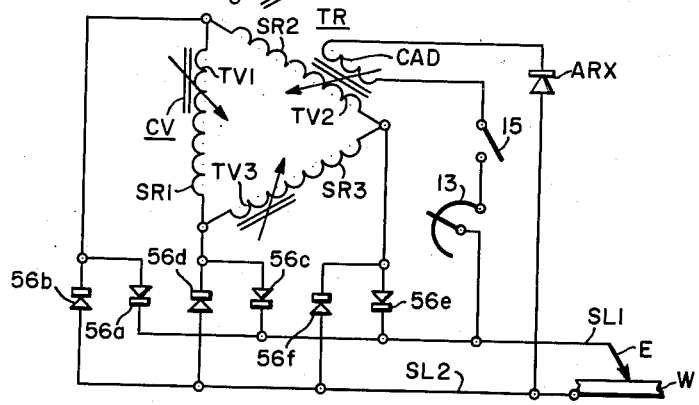
Figure 1 is a circuit diagram showing a preferred embodiment of this invention.
Figure 2:
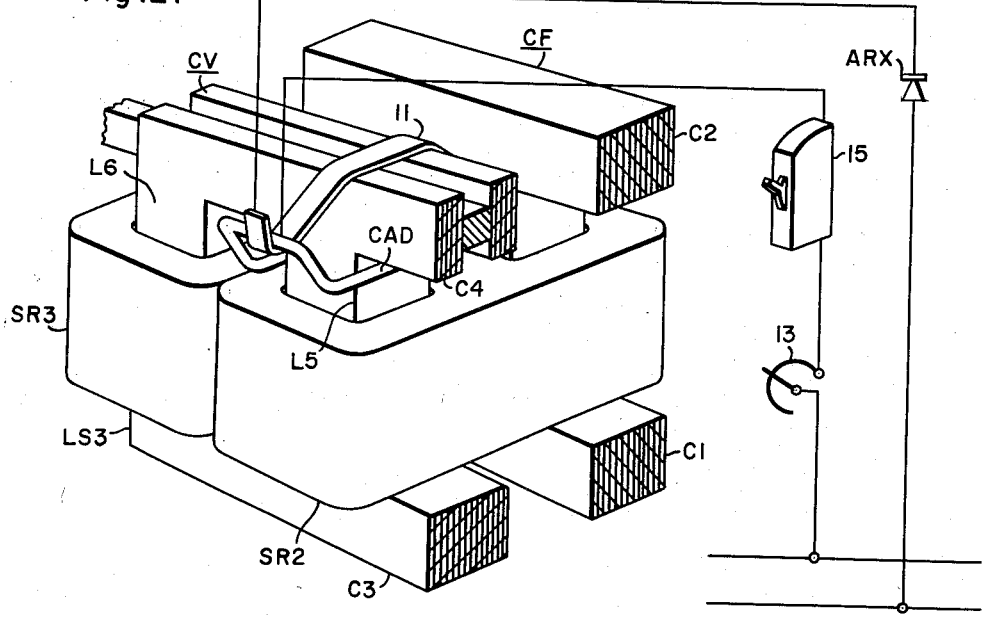
Fig. 2 is a view in prospective of a transformer-reactor unit in accordance with this invention showing the manner in which the arc-drive coil is mounted.
Figure 3:
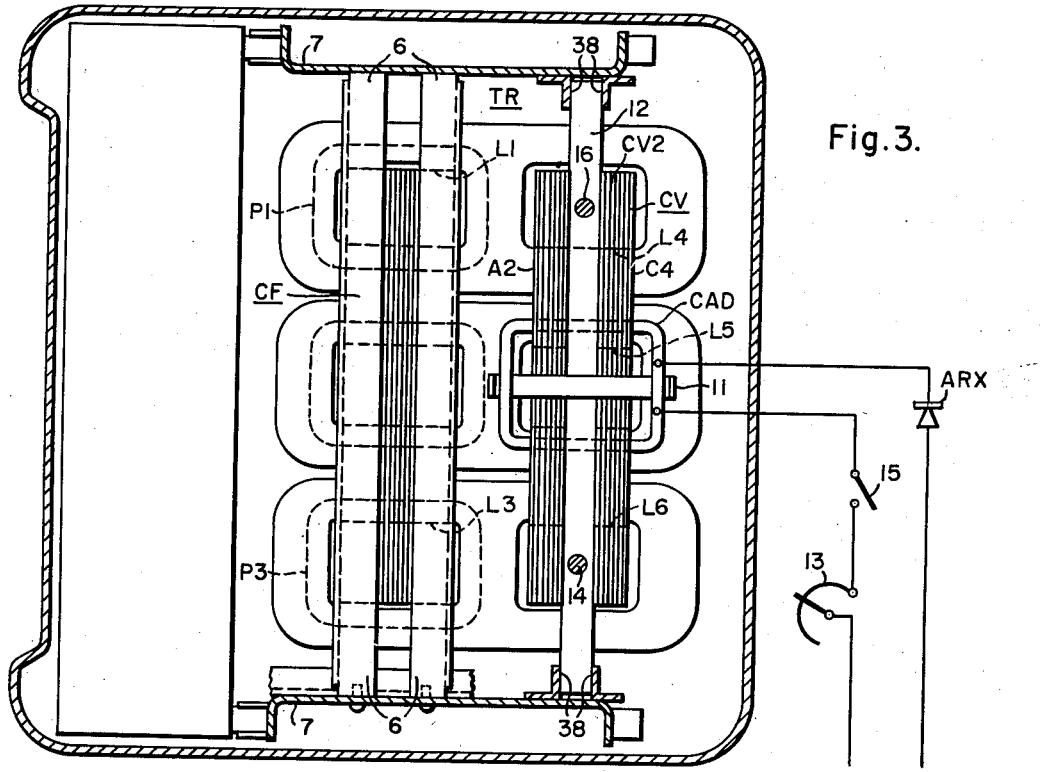
Fig. 3 is a view in section of the apparatus shown in Fig. 2.

The apparatus shown in Figs. 1, 2 and 3 includes a transformer reactor unit TR having primary windings P1, P2 and P3 and secondary-reactor windings SR1, SR2 and SR3. The primary windings P1, P2, P3 are wound on the legs L1, L2 and L3 of a fixed or transformer core CF. The secondary-reactor windings SR1, SR2, SR3 are wound partly on the legs L1, L2, L3 of the transformer core CF and partly on the legs L4–LS1, L5–LS2 and L6–LS3 of a variable reluctance or reactor core CV. The secondary-reactor windings SR1, SR2 and SR3 each has a number of turns T1, T2, T3 respectively, both on the legs L4–LS1, L5–LS2 and L6–LS3 of the variable reluctance core CV and on the legs L1, L2, L3 of the fixed core CF and a number of turns TV1, TV2 and TV3 respectively only on the legs L4–LS1, L5–LS2 and L6–LS3. The turns TV1, TV2, TV3 constitute reactor turns the reactance of which is variable by varying the reluctance of core CV.

The primaries P1, P2 and P3 are connected in delta, and are supplied from conductors W1, W2 and W3 which may, in turn, be connected to the buses of a commercial supply through the usual disconnects or circuit breakers (not shown). The secondary-reactor windings SR1, SR2 and SR3 are connected in a delta network.

The apparatus also includes a main rectifier MRX consisting of rectifier units 56a through 56f. The units 56a through 56f are connected in a rectifying bridge network to the apices of the delta including the secondary-reactor windings SR1, SR2 and SR3. The direct-current output conductors SL1 and SL2 of the rectifier MRX are connected respectively to the electrode E and the work W.

The apparatus includes an arc-drive coil CAD. This coil CAD is replaceably suspended from a mounting clip or bracket 11 about the leg L5 of a variable reluctance core CV in inductive relationship with this core CV. The clip 11 may be mounted on the cross member or yoke C4 of the core CV. The current induced in the coil CAD then depends on the current flowing through and the voltage absorbed by the secondary-reactor windings SR1, SR2 and SR3 and particularly the turns TV1, TV2 and TV3 of these windings wound on the core CV. The volts per turn induced in the coil CAD is the same as the volts per turn impressed on the turns TV1, TV2, TV3. The coil is connected to the conductors SL1 and SL2 through an auxiliary rectifier ARX, a variable resistor 13 and a circuit breaker 15 which may be a single pole quick-lag R breaker of the type sold by Westinghouse Electric Corporation. The rectifier ARX is so poled that the potential derivable from the coil CAD aids the potential derivable through the main rectifier MRX. The breaker 15 is normally closed and opens in the event of an overload, the opening of the breaker opens the coil circuit completely.

In the use of the apparatus, direct current potential is impressed between the electrode E and the work W through the rectifier MRX. When the electrode E is disengaged from the work W, no current flows and the current flow through the turns TV1, TV2 and TV3 is zero. There is no potential induced in the arc-drive coil CAD and the arc-drive potential impressed between conductors SL1, and SL2 is zero.

An arc may be fired between the electrode E and the work W by momentarily touching the electrode E to the work W. While the arc is burning normally, the arc potential may be of moderate magnitude of the order of 20 to 30 volts. Under such circumstance, the drop across the turns TV1, TV2 and TV3 is relatively small and the arc-drive potential induced across coil CAD is relatively small. When a short circuit is about to occur, the drop across the arc becomes progressively smaller as the short-circuit is approached and the drop across the turns TV1, TV2 and TV3 becomes progressively larger. Potential induced in the coil CAD then increases progressively and this potential appears between the conductors SL1 and SL2 blowing out the short circuit before it occurs or instantaneously after it occurs.

If during normal operation the coil CAD should draw current for too long a time interval, for example because the electrode sticks to the work or is held in contact with the work by the operator for too long a time interval, the circuit breaker would open interrupting the flow of any current in the loop including the coil CAD, the rectifier ARX, the variable resistor 13, and the circuit breaker 15. Since the coil CAD is suspended from a clip or bracket 11, it may be readily replaced when it burns out. In addition, apparatus not including the arc-drive features may be readily provided with this feature by the simple addition of the coil CAD on the clip 11 and the rectifier ARX, the breaker 15 and the variable resistor 13.

Figure 5:
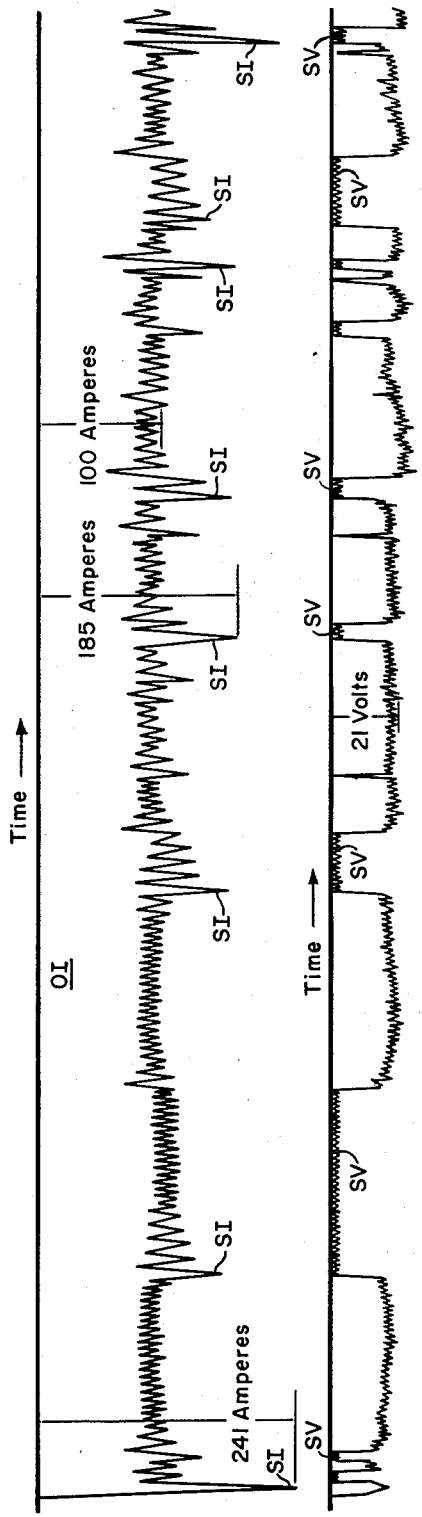
Fig. 5 is an oscillogram showing the current and voltage waves in welding with apparatus without arc-drive.
Figure 6:
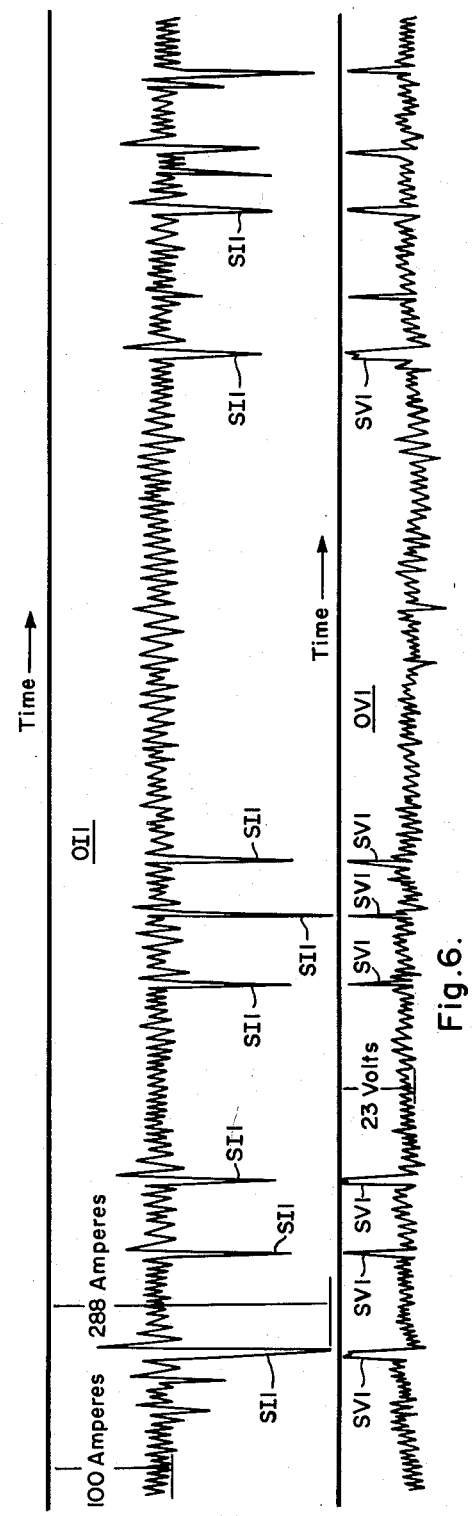
Fig. 6 is a similar oscillogram showing the current and voltage of comparable apparatus in accordance with this invention.

The improvement achieved with the arc drive in accordance with this invention is illustrated in Figs. 5 and 6. In Fig. 5, current and voltage oscillograms OI and OV taken while a normal welding operation was carried out with the apparatus disclosed herein with the coil CAD removed, are reproduced. The short circuits are manifested by sharp waves SI of high amplitude in the current oscillograms and by zero voltage intervals SV in the voltage oscillograms. Attention is called to the relatively long zero voltage intervals SV in the voltage oscillogram OV.

Fig. 6 is a reproduction of corresponding current and voltage oscillogram OI1 and OV1 for apparatus as disclosed with the coil CAD mounted as shown and described and with the auxiliary rectifier ARX and the other components connected in the circuit. In this case, the current peaks SI1 corresponding to high currents are longer than the corresponding peaks of Fig. 5. The increase in length corresponds to the increased current produced by the arc-drive. The intervals SV1 of zero voltage in Fig. 6 which occur for the short circuits are very short compared to the corresponding intervals of Fig. 5. The shortness corresponds to the arc-drive effect, that is, to the tendency of the increased current to disengage the droplets from the electrode and drive them towards the work before a short circuit occurs. The arc-drive network includes resistor 13 and other circuit resistances so that it is resistance limited thus having a low time-constant and very fast response compared to the main arc-welding circuit.

Figure 4:
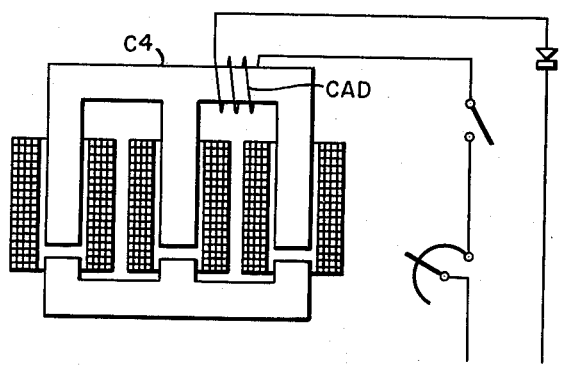
Fig. 4 is a diagrammatic view showing a modification of this invention.

The apparatus is shown in Figs. 1, 2 and 3, the coil CAD is wound on the leg L5. The coil may also be wound on any other part of the core, for example on the cross-members or yoke C4 as shown in Fig. 4.

While a preferred embodiment of this invention has been disclosed herein, many modifications thereof are feasible. This invention, then, is not to be restricted except insofar as is necessitated by the spirit of the prior art.

I claim as my invention:

1. Arc welding apparatus for welding work with a welding electrode comprising a conductor to be connected to said electrode, a conductor to be connected to said work, alternating-current power supply means, voltage absorbing reactive means, main rectifier means, means connecting said supply means, said reactive means and said rectifier means in circuit with said conductors so that direct current for welding is supplied to said conductors, a coil magnetically coupled to said reactive means, auxiliary rectifier means, and means connecting said coil and said auxiliary rectifier means in circuit with said conductors so that direct current potential producing current for arc drive is supplied from said coil through said auxiliary rectifier means in aiding relationship with the potential supplied through said main rectifier means when said reactive means absorbs substantial voltage, said arc-drive potential being of sufficient magnitude to become effective for arc drive when the voltage across the welding arc is substantially reduced by an approaching or existing short circuit.

2. Arc welding apparatus for welding work with an electrode comprising a work conductor to be connected to said work, an electrode conducted to be connected to said electrode, a transformer-reactor unit having a transformer core and a reactor core, and a secondary-reactor winding means wound at least in part about said reactor core, main rectifier means, means connecting said secondary reactor winding means and said rectifier means in a first circuit in direct-current-supply relationship with said conductors to supply current for arc welding, a coil mounted on said reactor core in magnetic inductive relationship therewith, auxiliary rectifier means, and means connecting said coil and said auxiliary rectifier means in a second circuit in direct-current-supply relationship with said conductors so that direct-current potential producing current for arc drive is supplied to said conductors from said coil, through said auxiliary rectifier means, said second circuit impressing a potential between said conductors of a polarity aiding the polarity of the potential impressed between said conductors by said first circuit.

3. Arc welding apparatus for welding work with a welding electrode comprising a conductor to be connected to said electrode, a conductor to be connected to said work, alternating-current power supply means, voltage absorbing reactive means, main rectifier means, means connecting said supply means, said reactive means and said rectifier means in circuit with said conductors so that direct current for welding is supplied to said conductors, a coil magnetically coupled to said reactive means, auxiliary rectifier means, circuit interrupting means, and means connecting said coil, said circuit interrupting means and said auxiliary rectifier means in circuit with said conductors so that direct current potential producing current for arc drive is supplied from said coil through said auxiliary rectifier means and said interrupter in aiding relationship with the potential supplied through said main rectifier means when said reactive means absorbs substantial voltage, said arc drive potential being of sufficient magnitude to become effective for arc drive when the voltage across the welding arc is substantially reduced by an approaching or existing short circuit, said circuit interrupting means being in the only path through which current can flow through said auxiliary rectifier means and said coil.

4. Arc welding apparatus for welding work with a welding electrode comprising a conductor to be connected to said electrode, a conductor to be connected to said work, alternating-current power supply means, voltage absorbing reactive means, main rectifier means, means connecting said supply means, said reactive means and said rectifier means in circuit with said conductors so that direct current for welding is supplied to said conductors, a coil magnetically coupled to said reactive means, a single-phase alternating potential of sufficient magnitude to produce arc-drive being impressed between the terminals of said coil when said reactive means absorbs substantial potential, auxiliary rectifier means, circuit interrupting means, and means connecting said coil, said circuit interrupting means and said auxiliary rectifier means in a half wave rectifying circuit with said conductors so that half wave direct-current potential producing current for arc drive is supplied from said coil to said conductors through said auxiliary rectifier means in aiding relationship with the potential supplied through said main rectifier means when said reactive means absorbs substantial potential, said arc drive potential being of sufficient magnitude to become effective for arc drive when the potential of the arc is reduced substantially by an approaching or existing short circuit.

5. Arc welding apparatus for welding work with an electrode comprising a work conductor to be connected to said work, an electrode conducted to be connected to said electrode, a transformer-reactor unit having a transformer core and a reactor core, and a secondary-reactor winding means wound at least in part about said reactor core, main rectifier means, means connecting said secondary reactor winding means and said rectifier means in a first circuit in direct-current-supply relationship with said conductors to supply welding current, a coil mounted on said reactor core in magnetic inductive relationship therewith, said coil being readily removable from said core independently of said secondary-reactor winding means, auxiliary rectifier means, and means connecting said coil and said auxiliary rectifier means in a second circuit in direct-current-supply relationship with said conductors to supply a potential producing arc-drive current to said conductors from said coil through said rectifier means when the potential of said arc is substantially reduced by an approaching or existing short circuit, said second circuit impressing a potential between said conductors of a polarity aiding the polarity of the potential impressed between said conductors by said first circuit.

6. A transformer reactor unit including a transformer core, a reactor core, primary winding means mounted on said transformer core in inductive relationship with said transformer core, secondary reactor winding means mounted on said transformer and reactor cores in inductive relationship with said primary and with said reactor core, and a coil in addition to said secondary reactor winding means replaceably mounted on said reactor core in magnetic inductive relationship with said reactor core.

7. A transformer reactor unit including a transformer core, a reactor core magnetically isolated from said transformer core, primary winding means mounted on said transformer core in inductive relationship with said transformer core, secondary reactor winding means mounted on said transformer and reactor cores in inductive relationship with said primary and with said reactor core, and a coil in addition to said secondary reactor winding means replaceably mounted on said reactor core in magnetic inductive relationship with said reactor core.

References Cited in the file of this patent

UNITED STATES PATENTS

| | | |
|---|---|---|
| 2,225,052 | Holslag | Dec. 17, 1940 |
| 2,399,415 | White | Apr. 30, 1946 |
| 2,763,811 | Williams | Sept. 18, 1956 |
| 2,777,973 | Steele | Jan. 15, 1957 |
| 2,825,004 | Rebuffoni | Feb. 25, 1958 |